(12) United States Patent
Levien et al.

(10) Patent No.: US 7,865,140 B2
(45) Date of Patent: Jan. 4, 2011

(54) DEVICE PAIRING VIA INTERMEDIARY DEVICE

(75) Inventors: Royce A. Levien, Lexington, MA (US); Robert W. Lord, Seattle, WA (US); Mark A. Malamud, Seattle, WA (US); Alexander J. Cohen, Mill Valley, CA (US); John D. Rinaldo, Jr., Bellevue, WA (US); Edward K. Y. Jung, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 619 days.

(21) Appl. No.: 11/153,922

(22) Filed: Jun. 14, 2005

(65) Prior Publication Data

US 2006/0281409 A1 Dec. 14, 2006

(51) Int. Cl.
*H04B 7/00* (2006.01)
(52) U.S. Cl. ............... 455/41.2; 455/41.1; 455/41.3; 455/410; 455/411
(58) Field of Classification Search ....... 455/41.1–41.3, 455/410–411, 420
See application file for complete search history.

(56) References Cited

U.S. PATENT DOCUMENTS

| | | | |
|---|---|---|---|
| 5,805,672 A | 9/1998 | Barkat | |
| 6,377,825 B1 | 4/2002 | Kennedy | |
| 6,823,186 B2 * | 11/2004 | Salokannel et al. | 455/452.1 |
| 7,082,316 B2 * | 7/2006 | Eiden et al. | 455/519 |
| 2002/0137505 A1 | 9/2002 | Eiche | |
| 2004/0248513 A1 * | 12/2004 | Glass et al. | 455/41.1 |
| 2005/0266798 A1 * | 12/2005 | Moloney et al. | 455/41.2 |

OTHER PUBLICATIONS

"Cellport Announces First Universal, Hands-Free Cell Phone System for Cars"; Intelligent Transportation Society of America; Bearing a date of Jul. 16, 2001; pp. 1-2; printed on Feb. 24, 2006; located at: http://www.itsa.org/itsnews.nsf/key/5FAA?OpenDocument; Intelligent Transportation Society of America.

"eCash On the Move at Volkswagen"; iButton Applications/Dallas Semiconductor MAXIM, Bearing a date of 2006; pp. 1-2; printed on Feb. 27, 2006; located at: http://www.maxim-ic.com/products/ibutton/applications/index.cfm?Action=DD&id=21; Maxim Integrated Products.

"Ecma welcomes ISO/IEC of NFC Standard for short range wireless communication"; ecma International; Bearing a date of Dec. 8, 2003; printed Feb. 24, 2006; pp. 1-3; located at: http://www.ecma-international.org/news/Ecma-340-NFCIP-1.htm.

"Industry giants tout touch computing"; Computing; Bearing the dates of 1995-2006; pp. 1-2; printed Feb. 24, 2006; located at http://www.computing.co.uk/vnunet/news2124597/industry-giants; vnu business publications.

(Continued)

*Primary Examiner*—Tuan H Nguyen (57) ABSTRACT

A first device may include and/or involve at least one contact sensor, and logic to facilitate pairing between a second device and a third device as a result of contact between the contact sensor and at least one of the second and third devices.

13 Claims, 6 Drawing Sheets

OTHER PUBLICATIONS

Kiser, Ken; "Newall Electronics Introduces Wearable DRO Technology"; Industrial Product News Online; pp. 1-2; printed Feb. 24, 2006; located at: http://www.ipnews.com/archives/dro/jan02/newall%5Felect.htm.

Cameron, Casey et al.; "Knuckletop Computing: The Java Ring"; pp. 1-4; located at: http://java.sun.com/features/1998/03/rings.html.

Lewis, John; "Put on your human-machine interface"; Design News; Bearing dates of Aug. 20, 2001 and 1997-2006; pp. 1-4; printed Feb. 24, 2006; located at: http://designnews.com/article/CA_150040.html; Reed Business Information.

"Mass Transit in Istanbul Turkey" and "Parking in Argentina"; iButton Application/Dallas Semiconductor MAXIM; Bearing a date of 2006; pp. 1-3; printed Feb. 27, 2006; located at: http://www.maxim-ic.com/products/ibutton/applications/index.cfm?Action=DD&id=8; Maxim Integrated Products.

"Near Field Communication"; What You Need to Know About; Bearing a date of 2006; pp. 1-3; printed on Mar. 3, 2006; located at: http://experts.about.com/c/n/ne/Near_Field_Communication.htm; About, Inc.

"Near Field Communication"; Wikipedia; Bearing a date of Feb. 17, 2006; pp. 1-2; printed on Feb. 24, 2006; located at: http://en.wikipedia.org/wiki/Near_Field_Communication.

"Secure Website Logon and Transactions"; iButton Applications; Bearing a date of 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.

"Miscellaneous Voice Pairing Material," miscellaneous publications.

"Miscellaneous Sources for Near Field Communications," miscellaneous publications.

ECMA International, "Near Field Communication," Ecma/TC32-TG19/2004/1.

* cited by examiner

DEVICE PAIRING VIA INTERMEDIARY DEVICE

TECHNICAL FIELD

The present disclosure relates to the pairing of two devices for trusted cooperation.

BACKGROUND

Pairing involves establishing a communication channel between devices. Pairing is becoming more common in a world increasingly populated by cooperating devices. However, the mechanisms for pairing devices remain relatively primitive and do not take advantage of the rich variety of ways in which people and devices may interact with and among one another.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve applying a first device to facilitate pairing between a second device and a third device by touching the first device to the second device, and then touching the first device to the third device, with a result that the second device and third device are thus enabled to pair with one another.

The method may include and/or involve discontinuing pairing of the second device and the third device. The discontinuing pairing of the second device and the third device may include and/or involve discontinuing pairing when the second device and third device are no longer proximate with one another, and/or discontinuing pairing at least partially due to an action of a user of the first and/or second devices, and/or discontinuing pairing at least partially because the second device and/or third device are no longer proximate with the first device, and/or discontinuing pairing at least partially because an amount of authorized pairing time lapses, and/or discontinuing pairing of the second device and the third device at least partially as a result of completion of a task, for example at least partially as a result of placing a call, transferring a file, sending a message, or performing a backup.

The method may include and/or involve retaining information about the pairing of the second device and the third device.

The method may include and/or involve applying the retained information to resume pairing of the second device and the third device, after pairing of the second device and the third device is discontinued and/or interrupted. The applying the retained information to resume pairing of the second device and the third device, after pairing of the second device and the third device is discontinued and/or interrupted may include and/or involve applying the retained information to resume pairing of the second device and the third device once the second device and the third device are once again in proximity with one another, and/or applying the retained information to resume pairing of the second device and the third device when the first device is once again in contact with the second device and/or the third device, and/or applying the retained information to resume pairing of the second device and the third device, when the first device is once again in proximity with the second device and/or the third device.

The method may include and/or involve detecting a manner of contact between the first device and the second device and/or the third device. The detecting a manner of contact between the first device and the second device and/or the third device may include and/or involve detecting relative motion between the first device and the second device and/or the third device at a point or points of contact, and/or detecting a duration of contact between the first device and the second device and/or the third device, and determining from the duration of contact an indication of how and/or whether pairing of the second device and the third device should be accomplished, and/or detecting multiple instances of contact between the first device and the second device and/or the third device, and interpreting the multiple instances of contact as an indication of how and/or whether pairing of the second device and the third device should be accomplished, and/or detecting an intensity of contact between the first device and the second device and/or the third device, and interpreting the intensity of contact as an indication of how and/or whether pairing of the second device and the third device should be accomplished, and/or detecting a point or points of contact between the first device and the second device and/or the third device, and interpreting the point or points of contact as an indication of how and/or whether pairing of the second device and the third device should be accomplished. The detecting an intensity of contact between the first device and the second device and/or the third device, and interpreting the intensity of contact as an indication of how and/or whether pairing of the second device and the third device should be accomplished may include and/or involve detecting at least one of an average contact force, a peak contact force, or force gradient.

The method may include and/or involve providing one or more audible and/or visual and/or tactile indications on the progress and/or results of pairing of the second device and the third device. The providing one or more audible and/or visual and/or tactile indications on the progress and/or results of pairing of the second device and the third device may include and/or involve presenting at least one pairing option, and/or providing an indication that a user should provide input to the pairing process, and/or providing at least one of one or more lights, tones, vibrations, sounds, or display indications, and/or at least one of providing an indication that pairing was successful, providing an indication that pairing was unsuccessful due to insufficient available information, providing an indication that pairing between the devices is available, or providing an indication that pairing is in process. Presenting at least one pairing option may include and/or involve one or more of presenting options relevant to the way the pairing is accomplished, presenting options for parameters of the pairing, or presenting options for one or more tasks and/or function served by the pairing. The providing an indication that a user should provide input to the pairing process may include and/or involve providing an indication that the user should provide at least one of a password, spoken input, biometric input, or information from a card and/or memory device. Presenting options for parameters of the pairing may include and/or involve presenting options for pairing duration, location constraints, or conditions for terminating pairing.

The method may include and/or involve awaiting user input as a result of contact between the first device and the second device and/or third device. The awaiting user input as a result of contact between the first device and the second device and/or third device may include and/or involve awaiting at least one of input from a keypad, one or more buttons, a voice input, or a biometric input, and/or awaiting authentication information for the user.

The method may include and/or involve receiving user input to the pairing process.

The method may include and/or involve applying the user input to complete the pairing of the second device and the third device.

A system may include and/or involve a first device, a second device, and a third device, and logic to facilitate pairing between the second device and the third device as a result of contact between the first device and at least one of the second and third devices. The logic to facilitate pairing between the second device and the third device as a result of contact between the first device and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device, and/or logic to pick up pairing information from the second device as a result of contact with the second device, and to carry the pairing information and to communicate the pairing information to the third device as a result of contact with the third device, and/or logic to wirelessly communicate information received from either or both of the second device and third device to a fourth device in order to facilitate pairing of the second device and the third device. The logic to communicate pairing information to the second device as a result of contact with the second device, and to communicate the pairing information to the third device as a result of contact with the third device may include and/or involve logic to communicate the pairing information via one or more points of contact, and/or logic to communicate the pairing information using short-range wireless technology, and/or logic to communicate the pairing information after a time or times of contact with the second device and/or the third device has ended, and/or logic to wirelessly communicate pairing information prior to contact with the second device and/or the third device, and to communicate additional pairing information upon contact with the second device and/or third device, the additional pairing information employed by the second device and/or third device during pairing, and/or logic to communicate the pairing information during a time or times of contact with the second device and/or the third device, and/or logic to communicate information stored by the first device prior to contact with either of the second device or the third device. The logic to wirelessly communicate pairing information received from either or both of the second device and third device to a fourth device in order to facilitate pairing of the second device and the third device may include and/or involve logic to communicate user and/or device authentication information to the fourth device. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The system may include logic to communicate device and/or user authentication and/or authorization information to the second and/or third devices, for example as a result of contact between the second and/or third devices and the first device.

The system may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity, and/or logic to apply the retained information to resume pairing of the second device and the third device when the first device is once again in contact with the second device and/or the third device, and/or logic to apply the retained information to resume pairing of the second device and the third device, once the first device is once again in proximity with the second device and the third device.

The system may include and/or involve logic to discontinue pairing of the second device and the third device. The logic to discontinue pairing of the second device and the third device may include and/or involve logic to discontinue pairing when the second device and/or third device are no longer proximate with the first device, and/or logic to discontinue pairing if an amount of authorized user time lapses, and/or discontinuing pairing of the at least two devices as a result of completion of a task, for example as a result of placing a call, transferring a file, sending a message, or performing a backup.

The system may include and/or involve logic to detect a manner of contact between the first device and the second device and/or the third device. The logic to detect a manner of contact between the first device and the second device and/or the third device may include and/or involve logic to detect relative motion between the first device and the second device and/or the third device at a point or points of contact, and/or logic to detect a duration of contact between the first device and the second device and/or the third device, and to determine from the duration of contact an indication of how and/or whether pairing of the second device and the third device should be accomplished, and/or logic to detect multiple instances of contact between the first device and the second device and/or the third device, and to interpret the multiple instances of contact as an indication of how and/or whether pairing of the second device and the third device should be accomplished, and/or logic to detect an intensity of contact between the first device and the second device and/or the third device, and to interpret the intensity of contact as an indication of how and/or whether pairing of the second device and the third device should be accomplished. The logic to detect an intensity of contact between the first device and the second device and/or the third device, and to interpret the intensity of contact as an indication of how and/or whether pairing of the second device and the third device should be accomplished may include and/or involve logic to detect at least one of an average contact force, a peak contact force, or force gradient.

The system may include and/or involve logic to await user input as a result of contact between the first device and the second device and/or third device. The logic to await user input as a result of contact between the first device and the second device and/or third device may include and/or involve logic to await at least one of input from a keypad, one or more buttons, a voice input, or a biometric input, and/or logic to await authentication information for the user.

The system may include and/or involve logic to provide one or more audible and/or visual and/or tactile indications on the progress and/or results of pairing of the second device and the third device. The logic to provide one or more audible and/or visual and/or tactile indications on the progress and/or results of pairing of the second device and the third device may include and/or involve logic to provide at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, spoken input, biometric input, or information from a card and/or memory device.

A first device may include and/or involve at least one contact sensor, and logic to facilitate pairing between a second device and a third device as a result of contact between the contact sensor and at least one of the second and third devices. The logic to facilitate pairing between a second device and a third device as a result of contact between the contact sensor and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device, and/or logic to pick up pairing information from the second device as a result of contact with the second device, and to carry the pairing information and to communicate the pairing information to the third device as a result of contact with the third device, and/or logic to wirelessly communicate pairing information received from either or both of the second device and third device to a fourth device in order to facilitate pairing of the second device and the third device, and/or logic to detect a time interval between contact of the first device with the second device, and contact of the first device with the third device. The logic to communicate pairing information to the second device as a result of contact with the second device, and to communicate the pairing information to the third device as a result of contact with the third device may include and/or involve logic to communicate the pairing information via one or more points of contact, and/or logic to communicate the pairing information using short-range wireless technology, and/or logic to communicate the pairing information during a time or times of contact with the second device and/or the third device, and/or logic to communicate information stored by the first device prior to contact with either of the second device or the third device, and/or logic to wirelessly communicate pairing information prior to contact with the second device and/or the third device, and to communicate additional pairing information upon contact with the second device and/or third device, the additional pairing information employed by the second device and/or third device to pair, and/or logic to communicate the pairing information during a time or times of contact with the second device and/or the third device, and/or logic to communicate the pairing information after a time or times of contact with the second device and/or the third device has ended. The logic to wirelessly communicate pairing information received from either or both of the second device and third device to a fourth device in order to facilitate pairing of the second device and the third device may include and/or involve logic to communicate user and/or device authentication information to the fourth device. The logic to detect a time interval between contact of the first device with the second device, and contact of the first device with the third device may include and/or involve logic to communicate pairing information to the third device sufficient to cause pairing with the second device to proceed only when the time interval does not exceed a threshold. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The additional pairing information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information. The logic to facilitate pairing between a second device and a third device as a result of contact between the contact sensor and at least one of the second and third devices may include and/or involve logic to communicate device and/or user authentication and/or authorization information to the second and/or third devices.

The first device may include and/or involve logic to perform wireless communications.

The first device may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity, and/or logic to apply the retained information to resume pairing of the second device and the third device when the first device is once again in contact with the second device and/or the third device.

The first device may include and/or involve logic to discontinue pairing of the second device and the third device. The logic to discontinue pairing of the second device and the third device may include and/or involve logic to discontinue pairing when the second device and/or third device are no longer proximate with the first device, and/or logic to discontinue pairing if an amount of authorized user time lapses.

The first device may include and/or involve logic to detect a manner of contact between the first device and the second device and/or the third device. The logic to detect a manner of contact between the first device and the second device and/or the third device may include and/or involve logic to detect relative motion between the first device and the second device and/or the third device at a point or points of contact, and/or logic to detect a duration of contact between the first device and the second device and/or the third device, and to determine from the duration of contact an indication of how and/or whether pairing of the second device and the third device should be accomplished, and/or logic to detect multiple instances of contact between the first device and the second device and/or the third device, and to interpret the multiple instances of contact as an indication of how and/or whether pairing of the second device and the third device should be accomplished, and/or logic to detect an intensity of contact between the first device and the second device and/or the third device, and to interpret the intensity of contact as an indication of how and/or whether pairing of the second device and the third device should be accomplished, and/or logic to detect a point or points of contact between the first device and the second device and/or the third device, and to interpret the point or points of contact as an indication of how and/or whether pairing of the second device and the third device should be accomplished. The logic to detect an intensity of contact between the first device and the second device and/or the third device, and to interpret the intensity of contact as an indication of how and/or whether pairing of the second device and the third device should be accomplished may include and/or involve logic to detect at least one of an average contact force, a peak contact force, or force gradient.

The first device may include and/or involve logic to await user input as a result of activation of the at least one contact sensor. The logic to await user input as a result of activation of the at least one contact sensor may include and/or involve logic to await at least one of input from a keypad, one or more buttons, a voice input, or a biometric input, and/or logic to await authentication information for the user.

The first device may include and/or involve logic to provide one or more audible and/or visual and/or tactile indications on the progress and/or results of pairing of the second device and the third device. The logic to provide one or more audible and/or visual and/or tactile indications on the progress and/or results of pairing of the second device and the third device may include and/or involve logic to provide at least one menu of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, spoken input, biometric input, or information from a card and/or memory device.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application. When the claims use the word "or" in reference to a list of two or more items, that word covers all of the following interpretations of the word: any of the items in the list, all of the items in the list and any combination of the items in the list.

"Logic" refers to signals and/or information that may be applied to affect the operation of a device. Software, hardware, and firmware are examples of logic. Hardware logic may be embodied in circuits. In general, logic may comprise combinations of software, hardware, and/or firmware.

Figure 1:
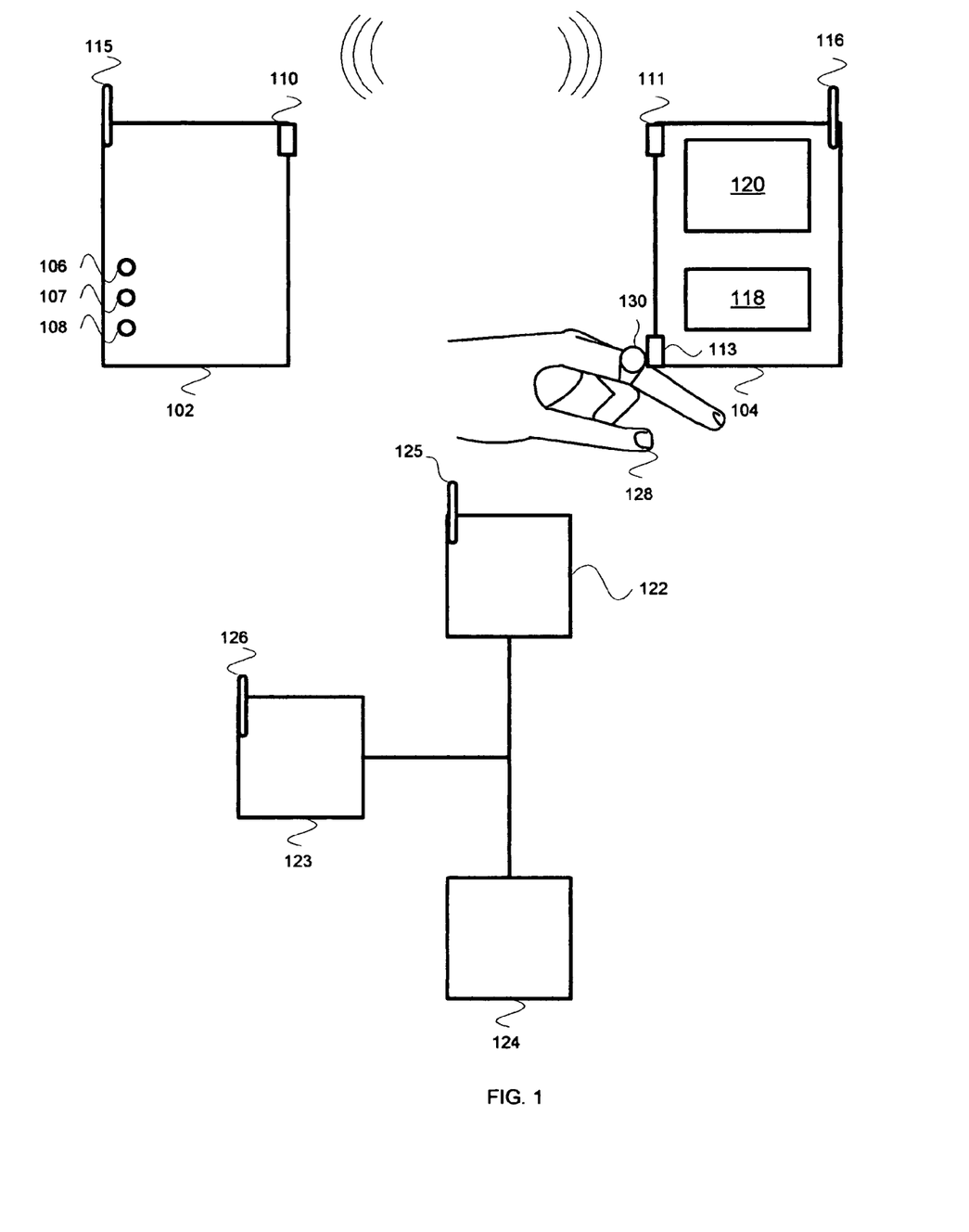
FIG. 1 is a block diagram of an embodiment of a device pairing arrangement.

Overview of FIG. 1

FIG. 1 is a block diagram of an embodiment of a device pairing system/arrangement. The system/arrangement may include and/or involve a first device 130, a second device 102, and a third device 104, and logic 118 to facilitate pairing between the second device 102 and the third device 104 as a result of contact between the first device 130 and at least one of the second 102 and third 104 devices.

The first device 130 is any device which, when it touches at least one of two other devices 102 and 104, may initiate pairing between the two other devices 102 and 104. In some cases, device 130 will contain a contact area (not shown in FIG. 1) which must be used as the touching surface in order to initiate pairing. In some cases, device 130 will possess a wireless communication capability, which may work in conjunction with its touching to effect pairing. In some implementations, the device 130 may be a ring worn on the hand 128 of a user of the devices 102 104.

The second device 102 includes a microphone 106, a speaker 107, a LED 108, an antenna 115 and a contact area 110. There may be more than one contact area 110. The contact area 110 may be incorporated in a complex device part such as a touch sensitive screen incorporating other functions such as display. The contact area 110 may be any part of device 102 which, when touched by another device 130, is recognized as touched by logic within device 102.

The microphone 106 may be used for sound input to the device 102 and may not be present in all embodiments. Sound input may include sounds such as tapping or voice input such as whistling or speaking. Voice input may be processed into words and/or phrases, and/or it may be processed as a sound pattern (e.g. a voice print). Voice input may be used, at least in part, as a biometric for individual identification.

The speaker 107 and LED 108 may be used for audible and visual information conveyed from the device 102, such as requests that an individual perform an action or feedback on the condition of some operation the device may have performed or be performing. The speaker 107 and/or LED 108 and/or other means for feedback may not be present in all embodiments. Other means of communicating information such as a buzzer, display, or tactile surface may be present additionally or instead of the speaker 107 and/or LED 108.

User feedback may be communicated to the user in various ways, such as those described above using speakers/LEDs/other outputs of the device, or via some other proximate device.

The device 102 may include an antenna 115 for wireless communication with other devices. The device 102 may include other features such as a scanner, a camera, or cellular telephone capabilities.

Examples of devices 102 and 104 include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A third device 104 includes contact areas 111 and 113, an antenna 116, logic 118, and a display 120. The device 104 may have a single contact area, or, as shown, two or more contact areas 111, 113. The device 104 need not include a display 120, although a display may prove useful for certain aspects of the pairing process. The display 120 could be part of the first device 102, or some other device such as 122 and/or 124.

The logic 118 operates to effect various techniques and acts for pairing the second device 102 and the third device 104. The logic 118 may exist on the first device 130, the second device 102, the third device 104, or in part on two or all of the devices 130, 102, 104. The logic 118 may exist, at least in part, on other devices, such as devices 122, and/or 124. The devices 122 and 124 may comprise a proximate laptop, desktop, or other computing device, and/or supporting network and communication equipment. The logic 118 may exist, at least in part, remotely from the pairing devices 102 and 104, such as on a remote device reachable over an intranet or the Internet.

The display 120 may be used to provide information to an individual or individuals such as the person or persons causing the contact between the two devices 130 and 102 and/or 104. In some embodiments, other means of communicating information such as an LED, buzzer, or speaker may be present additionally or instead of the display 120 on either or both of devices 102 and 104, and/or on a proximate device such as 122 or 124.

The antenna 116 enables wireless communication between the device 104 and other devices. The device 104 may include other features not described herein. The device 104 may be, among other things, a laptop, desktop, tower, or server computer. The device 104 may be attached via wireless or wired communications to an Intranet and/or the Internet and may provide, for example, a sophisticated application such as a medical patient monitoring station or machine control application for a machine tool.

At least one of devices 130, 102, and 104 may be movable or mobile, at least in part, thus enabling the touching that initiates pairing. In some cases, the device performing the touching 130, 102, and/or 104 may be moving during the period of touching. For example, the first device 130 may be moved horizontally across a touching surface 111 or 113 of device 104. In this example, the relative motion of devices 130 and 104 with respect to each other may convey information in addition to the fact of touching. This extra information may be needed to enable pairing. The extra information could, for example, facilitate identification of the pairing partner, or assist in authentication of the user. To assist in authentication, for example, the user could be required to provide a password and move the device 130 in a particular manner when contacting device 104.

The device pairing arrangement may also include additional devices, such as device 122, 123, and 124. Various data, logic, resources, and capabilities, including information and logic, to accomplish the pairing process may be provided by these other devices 122, 123, and 124. The devices 102 and/or 104 to pair may communicate with one or more of the devices 122-124 using wireless or other types of communication during the pairing process.

By way of example, one or more of the devices 122 123 may provide a network access point for a wired and/or wireless network. Thus, for example, the devices 122 123 may include antennae 125 126. The antennae 125 126 may enable one or both of devices 102 104 to communicate via a network with other devices, such as device 124, located remotely from devices 102, 104. Such communication may enable devices 102 and/or 104 to receive additional information from device 124 that may assist in the pairing process. Some of the logic 118 used to effectuate pairing including even in some cases the decision to pair may be embodied in a remote device or devices 124.

The logic 118 to facilitate pairing between the second device 102 and the third device 104 as a result of contact between the first device 130 and at least one of the second 102 and third 104 devices may include and/or involve logic in the first device 130 to receive pairing information from the second device 102 as a result of contact with the second device 102, and to communicate the pairing information to the third device 104 as a result of contact with the third device 104. There may be various manners of implementing the logic 118 to facilitate pairing between the second 102 and the third 104 device, including but not limited to logic to communicate pairing information to the second device 102 as a result of contact with the second device 102, and to communicate the pairing information to the third device 104 as a result of contact with the third device 104.

In some implementations the logic 118 to facilitate pairing between the second device and the third device may include and/or involve logic for the first device 130 to pick up pairing information from the second device 102 as a result of contact with the second device 102, and to carry the pairing information and then to communicate the pairing information to the third device 104 as a result of contact with the third device 104.

When information is communicated between the first device 130 and either or both of the second and third devices 102, 104, the means of communication may be either through the point of contact 110, 111, and/or 113 of the touching devices 130 and 102 or 104, wirelessly, or in some other manner.

It may be advantageous in certain implementations for the logic 118 to facilitate pairing between the second 102 and third 104 devices as a result of contact between the first device 130 and at least one of the second 102 and third 104 devices to include and/or involve logic to wirelessly communicate information received from either or both of the second device 102 and third device 104 to a fourth device 122, 124 in order to facilitate pairing. The logic 118 to wirelessly communicate pairing information received from either or both of the second device 102 and third device 104 to a fourth device 122, 124 in order to facilitate pairing of the second device 102 and the third device 104 may include and/or involve logic to communicate user and/or device authentication information to the fourth device 122 or 124.

The logic 118 to communicate pairing information to the second device 102 as a result of contact with the second device 102, and to communicate the pairing information to the third device 104 as a result of contact with the third device 104 may include and/or involve logic to communicate the pairing information via one or more points of contact, and/or logic to communicate the pairing information using short-range wireless technology. This may include and/or involve logic to communicate the pairing information after a time or times of contact with the second device and/or the third device has ended. This could also include and/or involve logic to wirelessly communicate pairing information prior to contact with the second device and/or the third device, and to communicate additional pairing information upon contact with the second device and/or third device, the additional pairing information employed by the second device and/or third device to pair.

The pairing information may be communicated only during a time or times of contact with the second device and/or the third device, or information stored by the first device may be communicated prior to contact with either of the second device or the third device.

The additional information employed by the second device and/or third device to pair may include and/or involve device and/or user authentication and/or authorization information. The logic to communicate information stored by the first device prior to contact with either of the second device or the third device may include and/or involve logic to store at least one of user authentication information and/or financial transaction information.

Pairing

The device pairing arrangement includes a first device 130, a second device 102, a third device 104 and logic 118 to effect pairing of the first and second devices upon detection of physical contact between the first device 130 and at least one of the second 102 and/or third 104 devices. Pairing involves cooperative operation of the two devices 102, 104, generally involving communication between the devices 102, 104. Effecting pairing may involve actions such as identifying either one or both devices 102, 104 or one or more device characteristics, features, and/or functions; identifying (authenticating) the person or some characteristic of the person using the devices 102, 104; authorizing the pairing and/or to what extent; and configuring one or both of the devices 102, 104 with settings and information to facilitate paired operation.

Pairing involves communication of information, between the first and second devices 130 and 102, and/or the first and third devices 130 and 104, and/or the second and third devices 102 and 104, and/or between the second and/or third devices 102 and/or 104 and other devices 122, 124. Information communicated between the devices as mentioned just above may be communicated in various ways, including using the contact points 110, 111, and/or 113, wirelessly, or using some wired communication method, or combinations thereof.

Information to facilitate pairing may be communicated between the two devices 102, 104, or almost entirely from one device to another. For example, device 102 may consist of a medallion or ring containing stored value (similar in concept to a prepaid phone card) which is used primarily to accomplish a commercial transaction. When the medallion 102 is touched to device 130, information about the stored value may be passed to device 130. Device 130 may then communicate this information to device 104 either by touching it or using short-range wireless communication. Device 104 may then perform many, most, or all actions necessary to establish pairing, such as identifying the commercial transaction and deciding if it may be accomplished. (The user may be interacting through a touch screen or keyboard or verbally with device 104 during this period.) Device 104 may then initiate pairing. While the two devices are paired, device 104 may pass information about the commercial transaction back to device 130 or device 102.

The information exchanged, and the direction of such exchange, may vary according to the implementation. For example, after being touched by device 130, device 102 might communicate information about a desired common purpose to the device 104 using wireless communications, along with information about its 102 capabilities. The device 104 may determine if it is suitable to provide the common purpose when paired with device 102, and notify device 102 of this decision. The device 102 may then pass information authenticating the person using it to the device 104. And so on.

Sometimes, effectuation of pairing may at times require an individual to provide an input to one or any of the devices 130, 102, 104, or to perform an action. For example, the user of the device 102 and/or 104 may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102, 104. For example, if an individual provides a biometric input to device 102, it might use the antenna 115 to communicate the fingerprint information wirelessly to device 123 via the antenna 126. Device 123 might then provide the fingerprint information, via a network, to device 124 for authentication and authorization of the user's permission to pair device 104 with device 102.

The information needed to effect pairing may be passed using a variety of physical medium. Some or all of the information needed to effect pairing may be communicated through the contact point 110 and 111 or 113 of the two devices 102, 104. Some or all of the information needed to effect pairing may be communicated using a wireless capability of either or both devices 102, 104. Either or both of devices 102, 104 may implement wired or wireless network connectivity, so that some or all of the information needed to effect pairing may be communicated to one or both devices via a communication network.

One or both devices 102, 104 may be paired with some other device (not shown) at the time at least one of the devices 102, 104 are touched by device 130. Depending on the circumstances, the original pairing or pairings may be terminated, and a pairing between the devices 102, 104 effected. Or, a second pairing may occur between devices 102, 104 and one or more original pairings may continue. In some circumstances, when the at least one of the devices 102, 104 are touched by a device 130, pairing may be rejected if one or both devices 102, 104 are already paired.

Authentication/Authorization

The logic 118 to effect pairing may include logic to authenticate and/or authorize pairing between the devices 102, 104. Authenticating and/or authorizing the pairing may include identifying one or both devices 102, 104 and/or identifying at least one device characteristic for one or both devices 102, 104, such as determining whether the devices 102, 104 are suitable for use for the purpose required and that they 102, 104 are compatible for pairing to accomplish that purpose.

For example, pairing may have been initiated with a goal of accomplishing a commercial transaction requiring secure communication. Both devices 102, 104 may have a device characteristic of supporting one or more varieties of encryption. However, they may support only DES encryption in common. The recognition that the devices are compatible and that DES encryption should be employed may occur as a result of the information exchanged during the pairing effectuation process.

Authenticating and/or authorizing pairing may include identifying a user of one or both of the devices) 102, 104 and/or to identify at least one characteristic of the user. For example, the user may be a member of a group, department, or organization, such as a computer network administrator with broad access privileges.

The system may include logic 118 to authorize an extent of pairing of the devices 102 104. By extent of pairing it is meant authorization of which functions and how extensively certain functions can be performed while the devices are paired. Authorization of an extent of pairing may be based, at least in part, on the identity or at least one characteristic of the user. Authorization of an extent of pairing may be based, at least in part, on the identity of the devices 102, 104 or device characteristics or state.

Other factors may be taken into consideration when authorizing an extent of pairing to allow. Authorization of an extent of pairing may be based, at least in part, on time of day or physical location. Authorization of an extent of pairing may be based, at least in part, on the manner of touching and/or point of physical contact 110, 111, 113 between the two devices 102, 104.

Authorization may be provided for a greater number and/or different functions and/or features of one or both devices 102, 104 than would be available if the devices were paired without physical contact.

A secure channel may be established between the devices for communication of information, particularly authentication/authorization information but in general any information that the devices exchange that should not be made available to other parties/devices that may be listening in.

Retaining Information

The system may include and/or involve logic 118 to retain information about the pairing of the second device 102 and the third device 104, after pairing of the second device 102 and the third device 104 is complete. The retained information may be applied to resume pairing of the second device 102 and the third device 104, after pairing of the second device 102 and the third device 104 is interrupted.

The retained information may be applied to resume pairing of the second device 102 and the third device 104 once the second device 102 and the third device 104 are once again in proximity. The retained information may be applied to resume pairing once the first device 130 is once again in proximity with the second device 102 and/or the third device 104. The logic 118 to apply the retained information to resume pairing after pairing is interrupted may include and/or involve logic to apply the retained information to resume pairing of the second device 102 and the third device 104 once the first device 130 is once again in contact or once again has been in contact with the second device 102 and/or the third device 104.

Discontinue Pairing

The system may include and/or involve logic 118 to discontinue pairing of the second device 102 and the third device 104. For example, pairing may be discontinued when the second device 102 and/or third device 104 are no longer proximate with the first device 130 and/or with one another, when an amount of authorized user time lapses, or based at least in part on some other factor, such as time of day or location.

Manner of Contact

The system may include and/or involve logic 118 to detect a manner of contact between the first device 130 and the second device 102 and/or the third device 104. Relative motion may be detected between the first device 130 and the second device 102 and/or the third device 104 at a point or points of contact 110, 111, and/or 113.

The duration of contact may be detected between the first device 130 and the second device 102 and/or the third device 104, and to determine from the duration of contact an indication of how and/or whether pairing should be accomplished.

Multiple instances of contact may be detected between the first device 130 and the second device 102 and/or the third device 104, and interpreted as an indication of how and/or whether pairing of should be accomplished.

The intensity of contact may be detected between the first device 130 and the second device 102 and/or the third device 104, and interpreted as an indication of how and/or whether pairing should be accomplished. At least one of an average contact force, a peak contact force, or force gradient may be detected.

User Input

The system may include and/or involve logic 118 to await user input as a result of contact between the first device 130 and the second device 102 and/or third device 104. As a result of contact, the system may await at least one of input from a keypad, one or more buttons, a voice input, a touch screen, or a biometric input. The user input may include and/or involve authentication information for the user.

Feedback

One or more audible and/or visual and/or tactile indications may be provided indicating the progress and/or results of pairing of the second device 102 and the third device 104. For example, one of one or more lights, tones, vibrations, sounds, or display indications may be provided. The indications may provide feedback on whether or not the pairing was successful, unsuccessful due to insufficient available information or for other reasons, to indicate that pairing between the devices is available, or to indicate that pairing is in process.

A user may be prompted to provide input to the pairing process. For example, the user may be prompted for a password, spoken input, biometric input, or information from a card and/or memory device. The system may present a menu of pairing options for the user to select from.

Interaction with Other Devices

The logic 118 may operate to communicate wirelessly with at least one device 122, 124 different than the two devices 102, 104 to obtain information needed to effect pairing between the devices 102, 104. The other device or devices 122, 124 may be physically near (same or close room or same building) or remotely located with respect to the location of the pairing devices 102, 104. The other device or devices 122, 124 may be accessed wirelessly, or via a network such as an intranet or the Internet.

Figure 2:
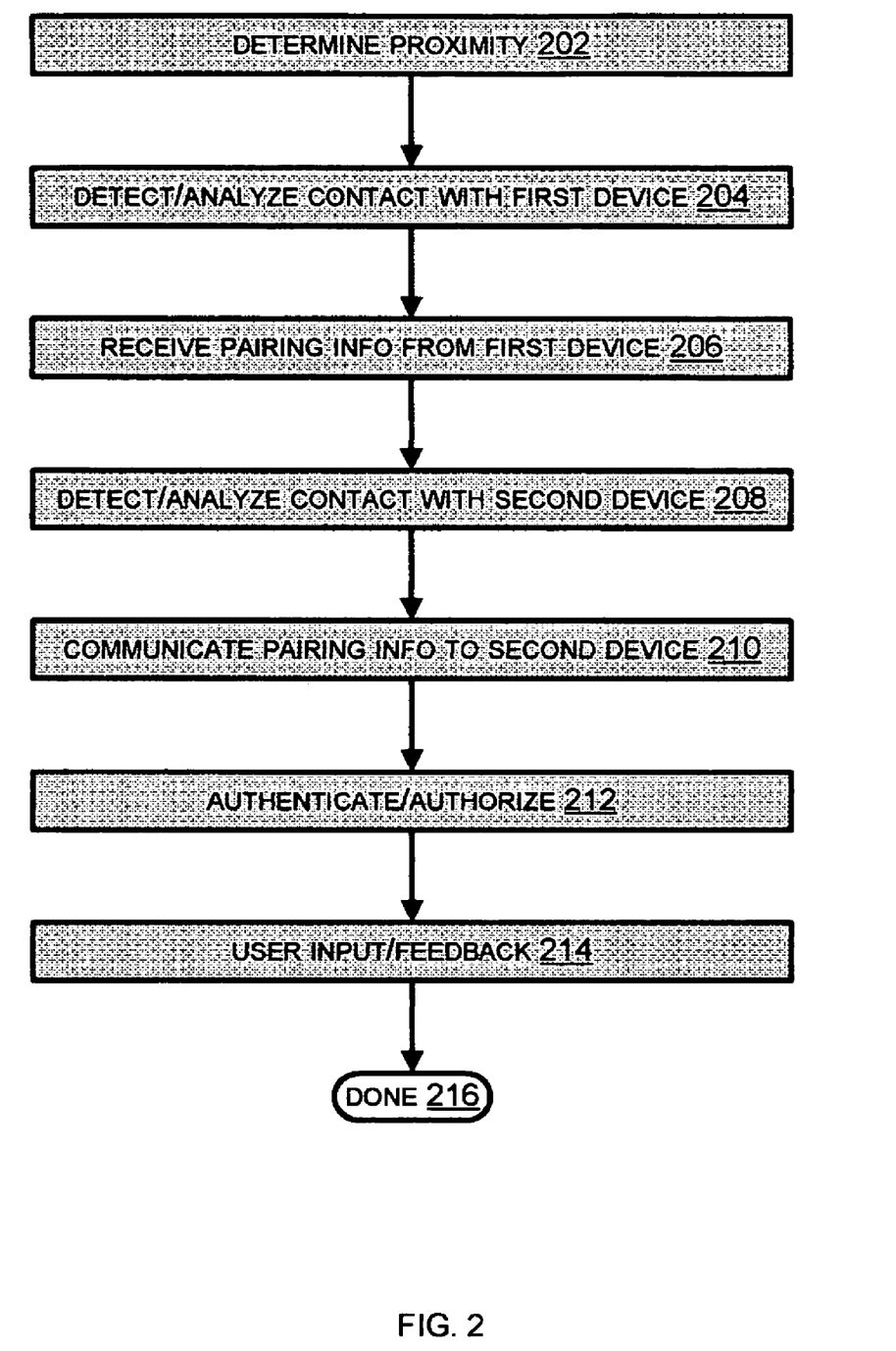
FIG. 2 is a flow chart of an embodiment of a device pairing technique.

Overview of FIG. 2

FIG. 2 is a flow chart of an embodiment of a device pairing method/technique. At 202, proximity is recognized between the first device and the second or third device. Alternatively or additionally, if one of the second or third devices is being moved, proximity may be recognized between the second and third devices (the two devices which are to be paired). Detection of proximity prior to any contact between the first device and the second and/or third device may result in communication between any two of the three devices or all three devices occur prior to contact.

At 204, contact is detected between the first and third devices. At 206, pairing information is communicated from the first device to the third device. Pairing information may be communicated wirelessly, via the contact point, or via another means.

At 208, the second device recognizes that it has been touched by the first device and analyzes information that it receives as a result of the contact.

At 210, pairing information is communicated either from the first device or from the third device to the second device.

At 212, either the first, second, or third device, or some other device use the information obtained to authenticate and/or authorize the desired pairing.

At 214, additional information is obtained from the user to complete the pairing process. Feedback is provided to the user on the status of pairing.

At 216, pairing concludes. The pairing has either now occurred or been rejected based on the processing which has occurred.

Thus, the first device is applied to facilitate pairing between a second device and a third device by touching the first device to the second device, and then touching the first device to the third device, with a result that the second device and third device are thus enabled to pair with one another.

Pairing in this fashion may result in access to a greater number and/or different functions of one or both devices than would be available if the devices were paired without physical contact with the intermediate device. Pairing may result in access to functions and/or features of one or both devices the extent of which varies according to the manner and/or point of physical contact between the devices.

The pairing process may be interrupted if the first device loses contact with the second or third device. The devices may exchange pairing information prior to, during, only during, or after a time when one of the devices is in physical contact with the first device.

Pairing of the second device and the third device may be discontinued for various reasons. Pairing may be discontinued when the second device and third device are no longer proximate with one another, when the second device and/or third device are no longer proximate with the first device, due to an action of a user of the first and/or second devices, after an amount of authorized user time lapses, and/or based on an external event, such as the current time of day or current location of the second or third devices.

Information about the pairing of the second device and the third device may be retained by the first (intermediate) device, or by another device or devices of the system. The retained information may be applied to resume pairing of the second device and the third device, after pairing of the second device and the third device is discontinued and/or interrupted. For example, the retained information may be applied to resume pairing of the two devices once the two devices are once again in proximity with one another, once the first device is once again in contact with the second device and/or the third device, and/or once the first device is once again in proximity with the second device and/or the third device.

The manner of contact between the first device and the second device and/or the third device may influence the pairing process, as previously described. Detecting a manner of contact may include and/or involve detecting a point or points of contact between the first device and the second device and/or the third device, and interpreting the point or points of contact as an indication of how and/or whether pairing of the second device and the third device should be accomplished.

One or more audible and/or visual and/or tactile indications on the progress and/or results of pairing of the second device and the third device may be provided, as previously described. In some situations, this could include and/or involve providing at least one of one or more lights, tones, vibrations, sounds, or display indications.

The system may present at least one pairing options, from which one may be selected by user input. Pairing options may include and/or involve one or more of options relevant to the way the pairing is accomplished, options for parameters of the pairing, or options for one or more tasks and/or functions served by the pairing. Options for parameters of the pairing may include and/or involve presenting options for pairing duration, location constraints, or conditions for terminating pairing.

As previously described, the system may await user input as a result of contact between the first device and the second device and/or third device. The user input may include and/or involve input from a keypad, one or more buttons, a voice input, a touch screen, or a biometric input.

Figure 3:
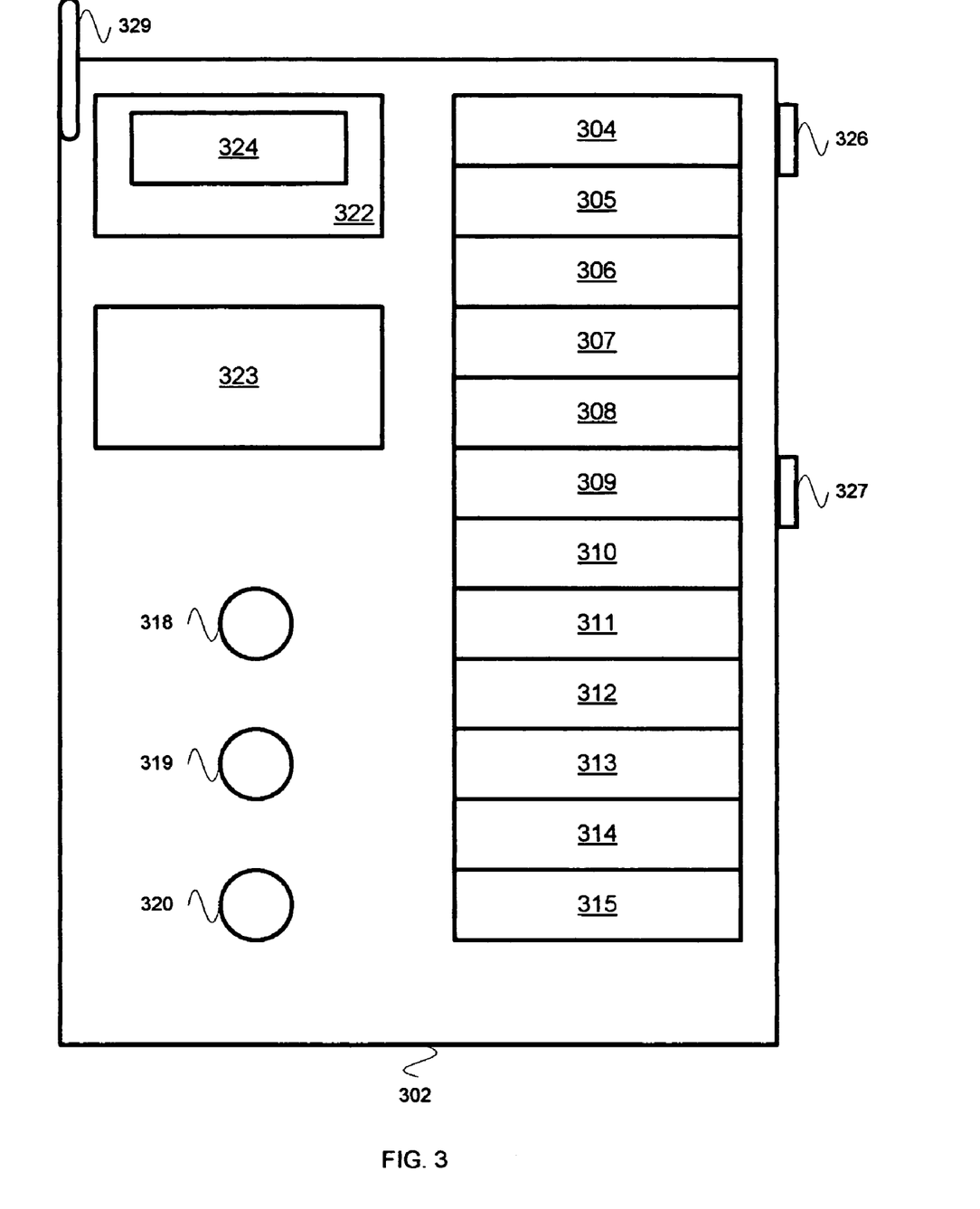
FIG. 3 is a block diagram of an embodiment of a pairing-capable device.

Overview of FIG. 3

FIG. 3 is a block diagram of an embodiment of a pairing-capable device. The device 302 includes a display 322 that may be used, among other things, to provide a menu 324 of options. The device includes a microphone 318 which may be used to detect sound (such as tapping) and/or voice input. The device includes a keypad 323. The device includes two parts which may be used to provide user feedback, a speaker 319 and a LED 320. The device includes two contact sensors 326 and 327. The device also includes various logic elements which may operate to effect device pairing. Of course, the device may include additional elements that are not shown here and which are superfluous to this discussion.

Logic of the device includes pairing process management logic 304, contact processing logic 305, wireless communication logic 306, proximity and motion logic 307, user input logic 308, speech processing logic 309, biometric processing logic 310, logic 311 to interact with a device or devices other than the two pairing devices, authentication logic 312, and authorization logic 313. Device logic also includes feedback logic 314 and logic 315 to interrupt, resume, and end pairing and to retain pairing information.

An antenna 329 enables the device to engage in wireless communication.

Not all embodiments of the device 302 will include all of the illustrated logic. For example, if a device 302 did not have a speaker 319 or microphone 318 and used no sound inputs or outputs, it would not need and probably would not have speech processing logic 309. If a device had no biometric input it would not need and probably would not have biometric processing logic 310. And so on.

The device logic 304-315 may be applied to facilitate pairing with at least one other device, in the manners described herein.

The device 302 may include feedback mechanisms (e.g. speaker 319, LED 320 and feedback operation logic 314) to provide one or more audible and/or visual and/or tactile indications on the progress and/or results of pairing, as described herein. For example, the logic 314 may provide at least one light, tone, vibration, sound, or display indication. The logic 314 may provide at least one menu 324 of pairing options, and/or an indication that a user should provide input to the pairing process.

The device 302 may include contact processing logic 305 to ascertain a manner in which contact occurs, and to interpret the manner of contact as an indication of how and/or whether pairing should proceed, for example in the manners previously described herein.

The device 302 may include logic 307 to detect proximity, and/or increasing proximity with the first device and/or device with which to pair, as described herein.

The device 302 may include logic 306 to enable the device to wirelessly exchange information with other devices, as described herein.

Figure 4:
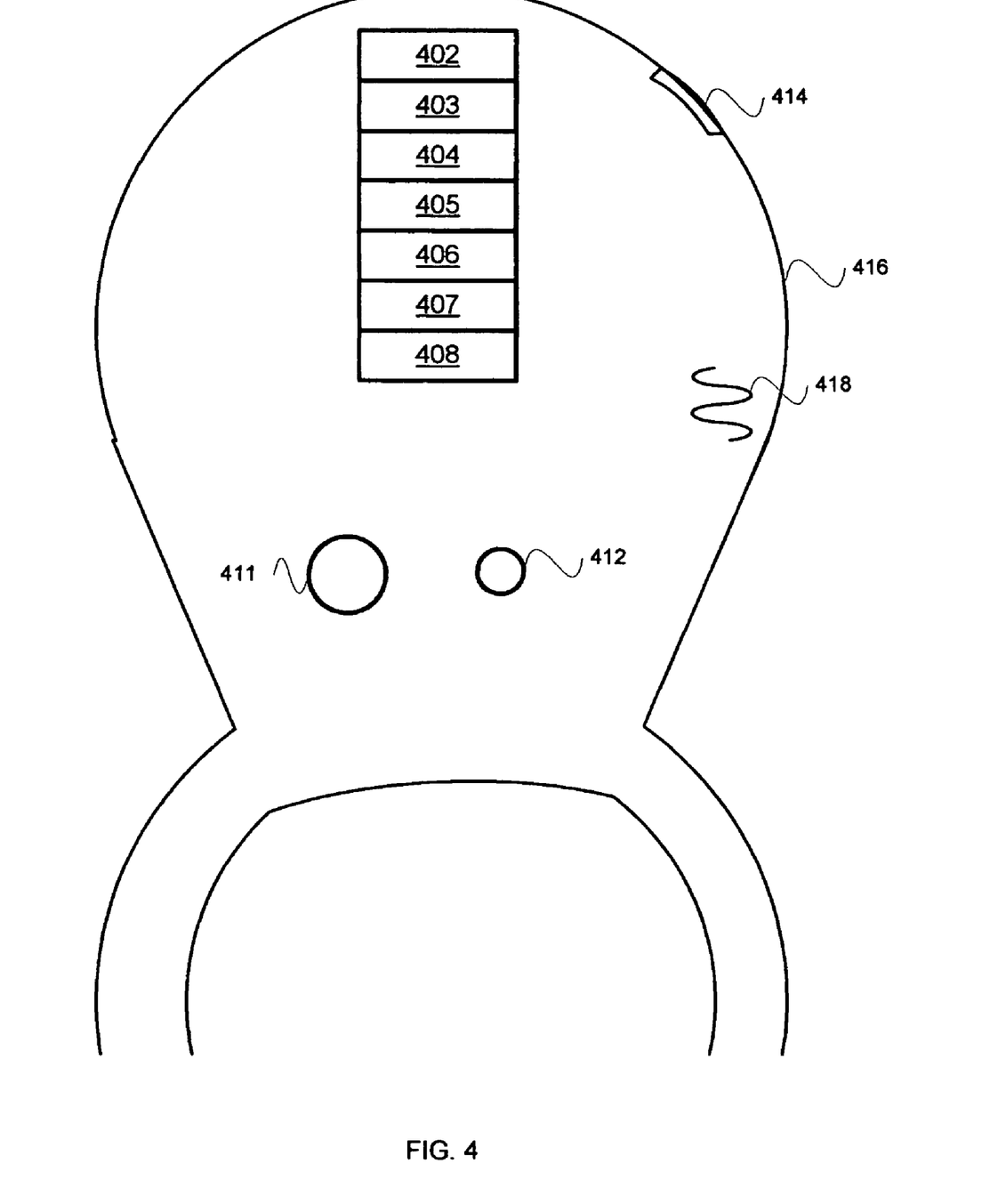
FIG. 4 is a block diagram of an embodiment of an intermediate device to facilitate pairing.

Overview of FIG. 4

FIG. 4 is a block diagram of an embodiment of an intermediate device 416, a.k.a. the intermediate device as referenced herein, which touches the second and/or third devices to facilitate pairing. The first device 416 includes a contact sensor 414 which includes all or part of the contact area used when touching another device. The device 416 includes an antenna 418, used for wireless communication with other devices. The device 416 includes a sound generator 411 and light generator 412, used, at least in part, to provide feedback on the progress and/or results of a pairing initiation.

The device 416 includes logic, including process control logic 402, contact detection and analysis logic 403, wireless communication logic 404, proximity detection logic 405, information exchange logic 406, feedback and user input logic 407, and memory 408 to hold logic and information.

The first device 416 may include and/or involve at least one contact sensor 414, and logic 402-406 to facilitate pairing between a second device and a third device as a result of contact between the contact sensor 414 and at least one of the second and third devices. The logic 402-406 to facilitate pairing between a second device and a third device as a result of contact between the contact sensor 414 and at least one of the second and third devices may include and/or involve logic to receive pairing information from the second device as a result of contact with the second device, and to communicate the pairing information to the third device as a result of contact with the third device, and/or logic to communicate pairing information to the second device as a result of contact with the second device, and to communicate the pairing information to the third device as a result of contact with the third device.

This may include and/or involve logic 406 to pick up pairing information from the second device as a result of contact with the second device, and to carry the pairing information and to communicate the pairing information to the third device as a result of contact with the third device. In some implementations the logic 402-406 to facilitate pairing between a second device and a third device as a result of contact between the contact sensor 414 and at least one of the second and third devices may also or alternatively include and/or involve logic 404 and 406 to wirelessly communicate pairing information received from either or both of the second device and third device to a fourth device in order to facilitate pairing of the second device and the third device. In some situations, this could include and/or involve logic to detect a time interval between contact of the first device with the second device, and contact of the first device with the third device.

The logic 402-406 to communicate pairing information to the second device as a result of contact with the second device and to communicate the pairing information to the third device as a result of contact with the third device may include and/or involve logic to communicate the pairing information via one or more points of contact 414. It may be advantageous, in certain implementations, for the logic to communicate pairing information to the second device as a result of contact with the second device, and to communicate the pairing information to the third device as a result of contact with the third device to include and/or involve logic 404 to communicate the pairing information using short-range wireless technology.

The logic 402-406 to communicate pairing information to the second device as a result of contact with the second device, and to communicate the pairing information to the third device as a result of contact with the third device may also or alternatively include and/or involve logic to communicate the pairing information during a time or times of contact with the second device and/or the third device. Alternatively or additionally, this logic may include logic to communicate information stored by the first device prior to contact with either of the second device or the third device. The logic 402-406 to communicate pairing information to the second device as a result of contact with the second device, and to communicate the pairing information to the third device as a result of contact with the third device may also or alternatively include and/or involve logic to wirelessly communicate pairing information prior to contact with the second device and/or the third device, and to communicate additional pairing information upon contact with the second device and/or third device, the additional pairing information employed by the second device and/or third device to pair. One manner of implementing this may include and/or involve logic to communicate the pairing information during a time or times of contact with the second device and/or the third device. In some situations, the logic may operate to communicate the pairing information after a time or times of contact with the second device and/or the third device has ended.

The logic 402-406 to wirelessly communicate pairing information received from either or both of the second device and third device to a fourth device in order to facilitate pairing of the second device and the third device may include and/or involve logic to communicate user and/or device authentication information to the fourth device.

The logic to detect a time interval between contact of the first device with the second device, and contact of the first device with the third device may include and/or involve logic to communicate pairing information to the third device sufficient to cause pairing with the second device to proceed only when the time interval does not exceed a threshold.

The additional pairing information employed by the second device and/or third device to pair may include and/or involve device and/or user authentication and/or authorization information. The logic to communicate information stored by the first device 416 prior to contact with either of the second device or the third device may include and/or involve logic to store at least one of user authentication information and/or financial transaction information. The additional pairing information employed by the second device and/or third device to pair may include and/or involve device and/or user authentication and/or authorization information.

The logic to communicate information stored by the first device 416 prior to contact with either of the second device or the third device may include and/or involve logic to store at least one of user authentication information and/or financial transaction information.

Retaining Information

The device 416 may include and/or involve logic to retain information about the pairing of the second device and the third device, after pairing of the second device and the third device is complete. The logic to retain information about the pairing of the second device and the third device, after pairing of the second device and the third device is complete may include and/or involve logic to apply the retained information to resume pairing of the second device and the third device, after pairing of the second device and the third device is interrupted. The logic to apply the retained information to resume pairing of the second device and the third device, after pairing of the second device and the third device is interrupted may include and/or involve logic to apply the retained information to resume pairing of the second device and the third device once the second device and the third device are once again in proximity. This could include and/or involve logic to apply the retained information to resume pairing of the second device and the third device once the first device 416 is once again in contact with the second device and/or the third device.

Discontinue Pairing

The first device 416 may include and/or involve logic to discontinue pairing of the second device and the third device. The logic to discontinue pairing of the second device and the third device may include and/or involve logic to discontinue pairing when the second device and/or third device are no longer proximate with the first device, and/or proximate with one another, and/or as a result of user action, and/or upon completion of a task or tasks, and/or after an amount of authorized user time lapses.

Manner of Contact

The first device 416 may include and/or involve logic 403 to detect a manner of contact between the first device 416 and the second device and/or the third device, as described herein. Various characteristics of the manner of contact may be detected and applied as an indication of how and/or whether pairing of the second device and the third device should be accomplished.

User Input and Feedback

The first device 416 may include and/or involve logic 407 to await user input as a result of activation of the at least one contact sensor 414, as described herein. The first device 416 may include and/or involve logic to provide one or more audible and/or visual and/or tactile indications on the progress and/or results of pairing of the second device and the third device, as described herein.

Figure 5:
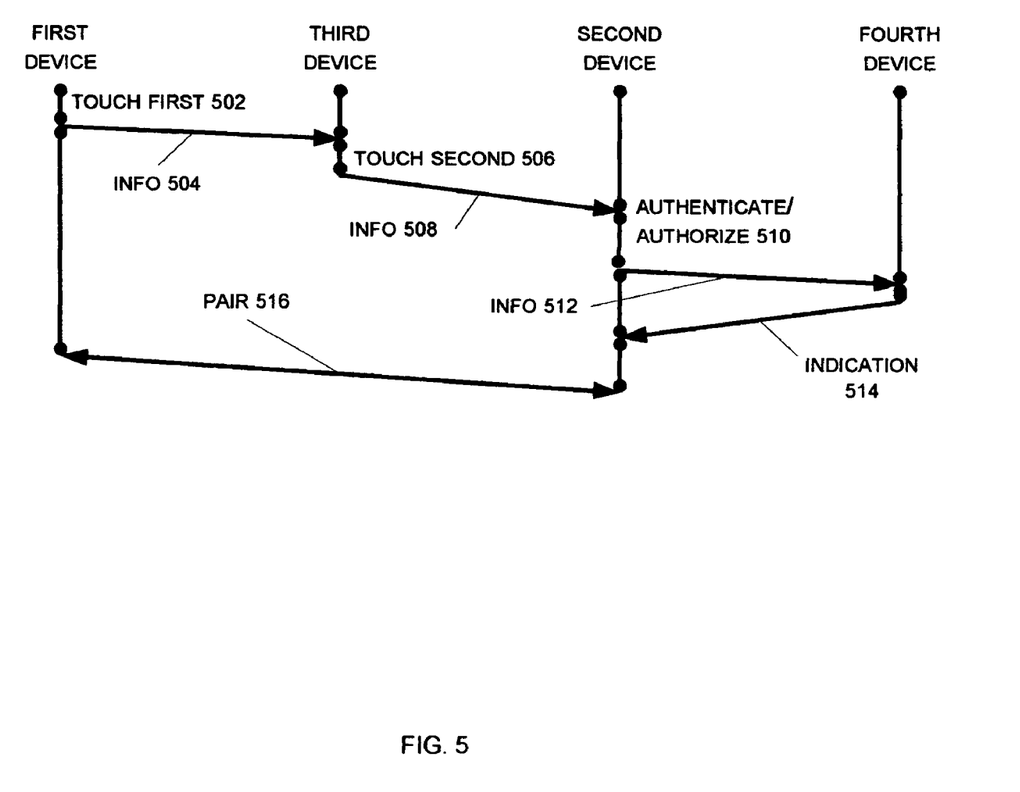
FIG. 5 is an action flow diagram of an embodiment of a pairing technique.

Overview of FIG. 5

FIG. 5 is an action flow diagram of an embodiment of a pairing technique.

At 502, the first device touches the third device.

At 504, information about the pairing is communicated from the first device to the third device.

At 506, the first device touches the second device.

At 508, information is sent from the third device to the second device. (The information sent by the third device may include the pairing information it received from the first device).

At 510, the second device begins analysis of the authentication and authorization information it now has.

At 512, the second device communicates some of the information, such as its gathered information as to which devices will be pairing, what the purpose of the pairing is, and its gathered information which may be used for authentication and authorization, to a fourth device.

At 514, the fourth device responds with a pairing go-ahead message, which may also include information as to the extent of pairing, i.e., the extent to which the second and third devices may work together in accomplishing the purpose.

At 516, the second and third devices pair.

As shown, the decision to authorize pairing may be accomplished by logic of a fourth (e.g. different from the first, second, or third) device. In some systems, authentication information may reside in a central data store external to the two pairing partner devices or intermediate device.

Figure 6:
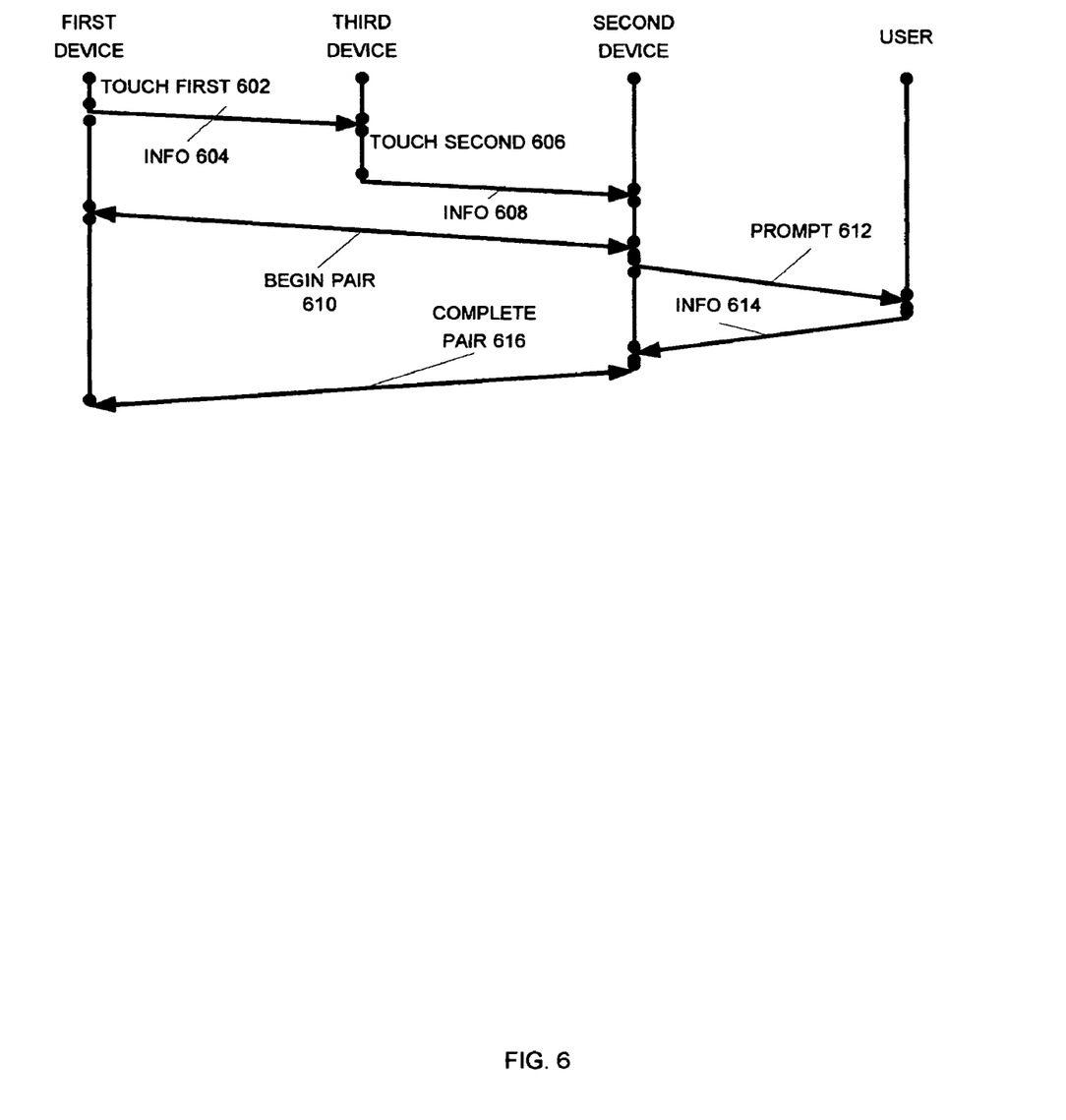
FIG. 6 is an action flow diagram of an embodiment of a pairing technique.

Overview of FIG. 6

FIG. 6 is an action flow diagram of an embodiment of a pairing technique.

At 602, the first device touches the third device.

At 604, information about the pairing is communicated from the first device to the third device.

At 606, the first device touches the second device.

At 608, information is sent from the third device to the second device. (The information sent by the third device may include the pairing information it received from the first device).

At 610, the first and third devices interact to begin the pairing process. The devices recognize that user input is needed to complete pairing. The first device is involved in the effecting of pairing in this action flow because it is performing an effecting role such as authentication or authorization analysis.

At 612, the devices prompt for, then await, user input.

At 614, the user performs an action providing the user input to the second device.

At 616, the second and first device, which now have enough information to determine if pairing should occur, and to what extent, conclude the pairing activity. The outcome may be no pairing, limited pairing, or successful pairing with no restrictions of scope.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising: facilitating pairing of a second device and a third device using a first electronic device by physically touching the first electronic device to the second device, physically separating the first electronic device from the second device, and then physically touching the first electronic device to the third device, wherein an indication of at least one of how and whether pairing of the second device and the third device should be accomplished is determined in response to relative motion and duration of contact detected between the first electronic device and at least one of the second device and the third device, wherein pairing information is communicated from the first electronic device to at least one of the second device and the third device as a result of physical contact with at least one of the second device and the third device.

2. The method of claim 1, wherein an indication of at least one of how and whether pairing of the second device and the third device should be accomplished is determined in response to relative motion and duration of contact detected between the first electronic device and at least one of the second device and the third device comprises:

wherein an indication of at least one of how and whether pairing of the second device and the third device should be accomplished is determined in response to multiple instances of contact detected between the first electronic device and at least one of the second device and the third device.

3. The method of claim 1, wherein an indication of at least one of how and whether pairing of the second device and the third device should be accomplished is determined in response to relative motion and duration of contact detected between the first electronic device and at least one of the second device and the third device comprises:

wherein an indication of at least one of how and whether pairing of the second device and the third device should be accomplished is determined in response to intensity of contact detected between the first electronic device and at least one of the second device and the third device.

4. The method of claim 3, wherein an indication of at least one of how and whether pairing of the second device and the third device should be accomplished is determined in response to intensity of contact detected between the first electronic device and at least one of the second device and the third device comprises:

wherein an indication of at least one of how and whether pairing of the second device and the third device should be accomplished is determined in response to at least one of average contact force, peak contact force, and force gradient detected between the first electronic device and at least one of the second device and the third device.

5. The method of claim 1, wherein an indication of at least one of how and whether pairing of the second device and the third device should be accomplished is determined in response to relative motion and duration of contact detected between the first electronic device and at least one of the second device and the third device comprises:

wherein an indication of at least one of how and whether pairing of the second device and the third device should be accomplished is determined in response to one or more points of contact detected between the first electronic device and at least one of the second device and the third device.

6. The method of claim 1, wherein the second device and the third device are designated by the first electronic device through contact.

7. The method of claim 1, wherein the facilitating pairing of a second device and a third device using a first electronic device comprises:

facilitating substantially unrestricted pairing of a second device and a third device using a first electronic device.

8. The method of claim 1, wherein the facilitating pairing of a second device and a third device using a first electronic device comprises:

facilitating pairing of a second device and a third device using a first electronic device that is substantially exclusively dedicated to enabling pairing.

9. A system comprising: a first electronic device, a second device, and a third device; logic to facilitate pairing between the second device and the third device as a result of physically touching the first electronic device to the second device, physically separating the first electronic device from the second device, physically touching the first electronic device to the third device, and wirelessly communicating information from at least one of the second device and the third device to a fourth device; and logic to communicate pairing information from memory of the first electronic device to at least one of the second device and the third device upon physical contact of the first electronic device with the second device or the third device.

10. The system of claim 9, wherein the logic to communicate pairing information from memory of the first electronic device to at least one of the second device and the third device comprises:

logic to receive the pairing information from the second device as a result of contact with the second device, and to communicate the pairing information to the third device as a result of contact with the third device.

11. The system of claim 9, wherein the logic to communicate pairing information from memory of the first electronic device to at least one of the second device and the third device comprises:

logic to communicate the pairing information to the second device as a result of contact with the second device, and to communicate the pairing information to the third device as a result of contact with the third device.

12. The system of claim 11, wherein the logic to communicate pairing information to the second device as a result of contact with the second device, and to communicate the pairing information to the third device as a result of contact with the third device comprises:

logic to communicate the pairing information via one or more points of contact.

13. The system of claim 9, wherein the logic to communicate pairing information from memory of the first electronic device to at least one of the second device and the third device comprises:

logic to communicate pairing information from memory of the first electronic device to at least one of the second device and the third device via one or more points of contact.

\* \* \* \* \*